United States Patent
Myllymaki et al.

(10) Patent No.: US 9,668,097 B2
(45) Date of Patent: May 30, 2017

(54) VIRTUAL GEOGRAPHIC PERIMETERS MADE UP OF MULTIPLE COMPONENT SHAPES

(71) Applicant: GOOGLE INC., Mountain View, CA (US)

(72) Inventors: Jussi Myllymaki, Espoo (FI); Anup Mantri, San Francisco, CA (US); Chandrasekhar Thota, Mountain View, CA (US)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 14/618,653

(22) Filed: Feb. 10, 2015

(65) Prior Publication Data

US 2015/0230054 A1  Aug. 13, 2015

Related U.S. Application Data

(60) Provisional application No. 61/938,537, filed on Feb. 11, 2014.

(51) Int. Cl.
*H04B 1/38* (2015.01)
*H04W 4/02* (2009.01)
*H04W 64/00* (2009.01)

(52) U.S. Cl.
CPC ......... *H04W 4/021* (2013.01); *H04W 64/006* (2013.01)

(58) Field of Classification Search
CPC ............. H04W 4/021; H04W 64/006370/328; 340/539.13; 455/457
See application file for complete search history.

(56) References Cited

U.S. PATENT DOCUMENTS 8,471,701 B2 * 6/2013 Yariv ................. G01C 21/3679
340/539.13
8,731,813 B2 * 5/2014 Sheha ..................... G01C 21/20
340/995.1

(Continued)

FOREIGN PATENT DOCUMENTS

WO  WO-2014/072510 A2  5/2014

OTHER PUBLICATIONS

Stackoverflow, "Android Geofencing (Polygon)," (2015). Retrieved from the Internet at URL:http://stackoverflow.com/questions/18486284/android-geofencing-polygon.

(Continued)

*Primary Examiner* — Charles Shedrick
(74) *Attorney, Agent, or Firm* — Marshall, Gerstein & Borun LLP

(57) ABSTRACT

A computing device includes one or more processors, a user interface, and a non-transitory computer-readable medium storing instructions for determining whether a certain geographic location is within a virtual perimeter of a geographic place. The instructions, when executed on the one or more processors, cause the computing device to determine multiple component shapes that approximately make up a geometry of the geographic place, determine whether the certain geographic location is within at least one of the component shapes, generate an indication that the geographic location is within the virtual perimeter if the geographic location is within at least one of the component shapes, and provide the indication via the user interface.

18 Claims, 7 Drawing Sheets

(56) References Cited

U.S. PATENT DOCUMENTS

| | | | |
|---|---|---|---|
| 2006/0126556 A1* | 6/2006 | Jiang .................. | H04L 12/18 370/328 |
| 2011/0178811 A1* | 7/2011 | Sheridan ............. | G01C 21/362 705/1.1 |
| 2011/0256881 A1* | 10/2011 | Huang ................. | G01S 5/0257 455/456.1 |
| 2012/0172027 A1* | 7/2012 | Partheesh ............ | H04W 4/021 455/420 |
| 2013/0099977 A1* | 4/2013 | Sheshadri ............ | H04W 4/022 342/450 |
| 2013/0199977 A1 | 8/2013 | Lee et al. | |
| 2015/0148061 A1* | 5/2015 | Koukoumidis ....... | H04W 4/022 455/456.1 |

OTHER PUBLICATIONS

ThunderMaps, "Geo-Fencing Just Got More Awesome," (2013). Retrieved from the Internet at URL:https://web.archive.org/web/20131209050247/http://thundermaps.com/geo-fencing-just-got-more-awesome/.

Wikipedia, "Polygonal Modeling," (2015). Retrieved from the Internet at URL:http://en.wikipedia.org/wiki/Polygonal_modeling.

ZOS.communications, "The ZOS Geofencing Suite," (2012). Retrieved from the Internet at URL:https//web.archive.org/web/20131127115730/http://zoscomm.com/products-and-solutions/geofencing-suite.

International Search Report and Written Opinion for Application No. PCT/US2015/015168, dated Apr. 22, 2015.

\* cited by examiner

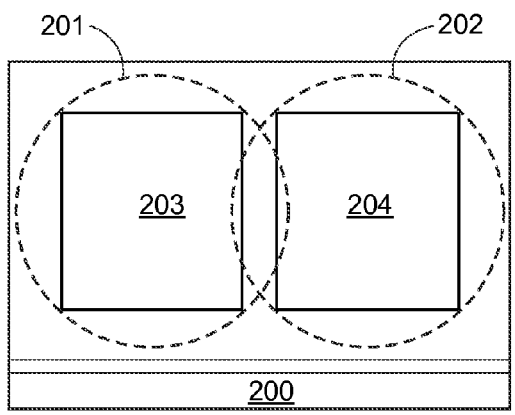
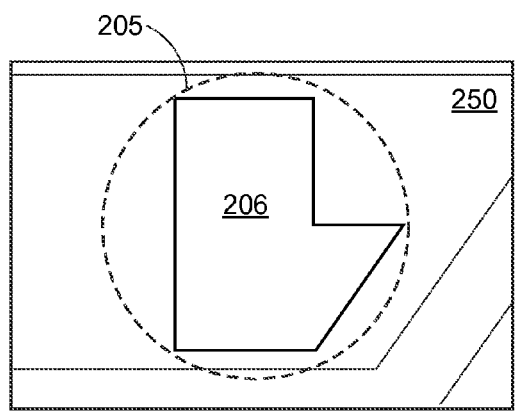
FIG. 2A  FIG. 2B
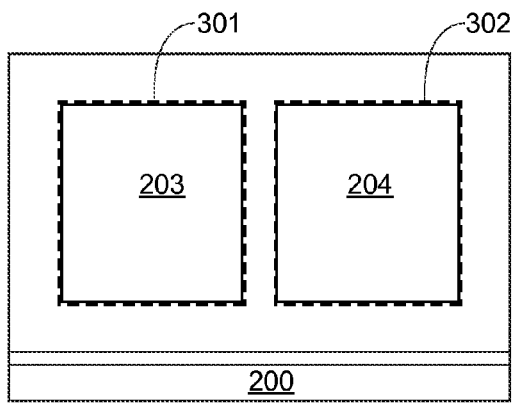
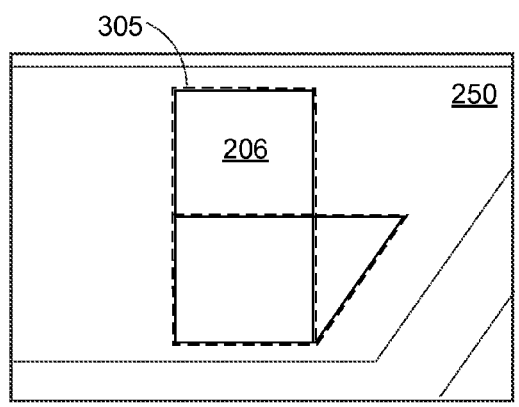
FIG. 3A  FIG. 3B

VIRTUAL GEOGRAPHIC PERIMETERS MADE UP OF MULTIPLE COMPONENT SHAPES

FIELD OF THE DISCLOSURE

The present disclosure relates to creating interactive digital maps and, more particularly, to generating and using virtual boundaries of geographic places.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Digital maps may be accessed through mapping applications on smart phones and many other handheld devices. Most of these devices are equipped with positioning sensors, such as Global Position System (GPS), which determine a user's location as a set of geographic coordinates. Some mapping applications may then determine whether a user is in a place of interest by checking whether the user's location is within a so-called geofence.

A geofence is a virtual perimeter created around a place (such as a business, landmark, residence, etc.). Although a typical place geometry isn't circular, geofences usually are set up as circles having a center point and radius.

SUMMARY

To efficiently determine whether a certain geographic location is within a geofence (a virtual perimeter) of a place having an arbitrary geometry (e.g., building outline) that can be relatively complex, a software system identifies multiple relatively simple component shapes that make up the geometry of the place. To determine whether the geographic location is within the perimeter, a computing device then determines whether the geographic location is enclosed by one or more of the component shapes. Because each of these checks is a relatively simple operation, the computing device can be a user device such as a smartphone or a tablet computer, for example.

In particular, in an embodiment, a computing device includes one or more processors, a user interface, and a non-transitory computer-readable medium storing instructions for determining whether a certain geographic location is within a virtual perimeter of a geographic place. The instructions, when executed on the one or more processors, cause the computing device to determine multiple component shapes that approximately make up a geometry of the geographic place, determine whether the certain geographic location is within at least one of the component shapes, generate an indication that the geographic location is within the virtual perimeter if the geographic location is within at least one of the component shapes, and provide the indication via the user interface.

In another embodiment, a method for generating virtual perimeters of geographic places includes receiving an indication of a geometry of a geographic place, receiving a limited set of one or more shapes, generating an approximate representation of the geometry as multiple of component shapes, each selected from the limited set of shapes, and using the approximate representation of the geometry as a virtual perimeter of the geographic place. Each of these acts can be performed by one or more computing devices.

A portable computing device includes a positioning module configured to determine a current location of the computing device and processing hardware coupled to the positioning module. The processing hardware is configured to receive an indication of a virtual perimeter of a geographic place, including multiple of component shapes that approximately make up the geometry of the geographic place. The processing hardware is further configured to determine whether a geometric point corresponding to the current location of the portable computing device is within one or more of the component shapes, and, in response to determining that the geometric point is within at least one of the component shapes, generate an indication that the portable computing device is within the virtual perimeter of the geographic place.

BRIEF DESCRIPTION OF THE DRAWINGS

FIG. 2A schematically illustrates a pair of partially overlapping geofences, each defined as a circle of a certain radius;

FIG. 2B schematically illustrates a circular geofence for a complex place geometry;

FIG. 3A schematically illustrates a pair of geofences created using one or several basic shapes;

FIG. 3B schematically illustrates a geofence created using one or several basic shapes for a complex place geometry;

DETAILED DESCRIPTION

Overview

Figure 1:
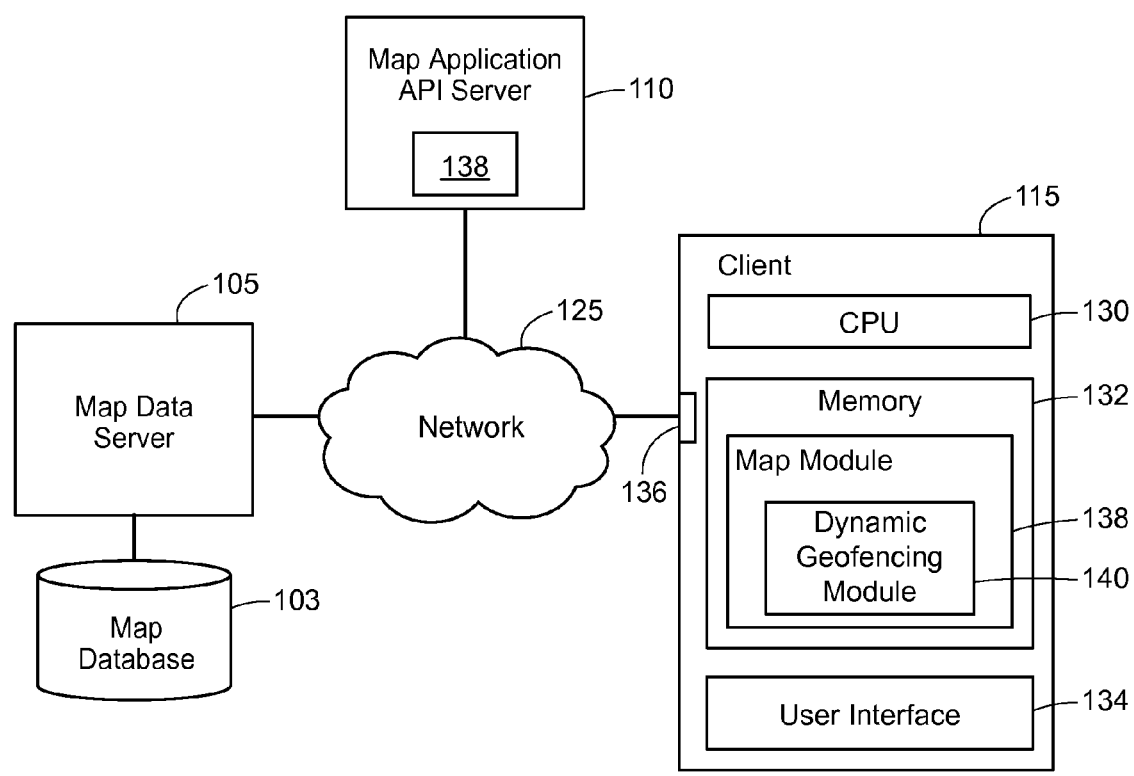
FIG. 1 is a block diagram of an example computing system which creates and uses composite geofence using the techniques of this disclosure.

In the embodiments discussed below, a dynamic geofencing system creates composite geofences for geographic places having relatively complex geometry. To this end, the geofencing system breaks down the geometry of a place into a set of component geometric shapes (circles, squares, triangles, etc.) to form a composite geofence. The component shapes can be "basic" shapes that can be manipulated relatively easily. Because using polygons in determining whether a location is within a geofence using a point-in-polygon or another suitable test may be computationally expensive in many cases, a composite geofence made up of several basic shapes allows network servers as well as user devices to efficiently use geofences.

To generate a composite geofence for a geographic place, the dynamic geofencing system in one implementation determines a "bounding rectangle" for the place, e.g., a rectangle in which the polygon defining the outline of the place is inscribed. The dynamic geofencing system then fills the rectangles with circles in accordance with a certain limit set on the number of circles, for example. The dynamic geofencing system then eliminates those circles that are completely outside the geometry of the place.

In another implementation, the dynamic geofencing system "tiles" the geometry of a geographic place by arranging multiple instances of a certain shape (such as a hexagon, a rectangle, a triangle, a parallelogram, etc.) so as to line up these instances perfectly with each other without overlapping. The dynamic geofencing system then maps each of these tiles into a circle, for example, by determining the center of each tile and determining a radius of a circle that entirely covers the tile.

When generating a composite geofence using these or other suitable techniques, the dynamic geofencing system can translate, scale, rotate, and otherwise transform basic shapes.

Depending on the embodiment, the geofencing system may create one or more geofences for a single place. The multiple geofences may provide different information. For example, the geofencing system may create an interior composite geofence and an exterior composite geofence for a certain place. The interior composite geofence can be used to determine whether a user is inside the place, while the exterior composite geofence can be used to determine whether the user is located near the place.

Once a composite geofence has been created, the geofencing system may use GPS data or other suitable positioning data to determine whether a user is located within any of the composite geofences. To this end, the geofencing system may check whether a user location is inside any of the basic geometric shapes that form the composite geofence. If a user is determined to be in or near the place, the geofencing system may present the user with information regarding the place, for example. Depending on the embodiment, the geofencing software component may execute locally on a portable computing device, such as a smartphone or a tablet computer, for example, and/or on one or more network server(s).

Example Systems, Devices, and Methods

With reference to FIGS. 1-8, several examples of the techniques of the present disclosure will now be described. As an initial matter, FIG. 1 illustrates examples of a computing environment 100 in which a geofencing component of a mapping application creates geofences. As illustrated in FIG. 1, the computing environment 100 includes a map database 103 connected to, or disposed within, a server 105, which, in turn, is connected to one or more client devices 115 through a network 125. Additionally, a map application/API server 110 may be connected to one or more client devices 115 through the network 125. The network 125 can include any suitable combination of a LAN, a MAN, a WAN, a mobile, a wired or wireless network, a private network, or a virtual private network. While only one client 115 is illustrated in FIG. 1 to simplify and clarify the description, it will be understood that any number of client devices are supported and be in communication with the servers 105 and 110.

The servers 105 and 110 and the client 115 are computing devices that may include a CPU 130 (only shown in the client), one or more computer readable memory modules 132, one or more user interfaces 134 (keyboard, touch screen, etc.), a network interface 136, one or more peripheral interfaces, and other components. Further, other types of computers can be used that have different architectures. The client device 115 represents any suitable handheld and/or mobile device, such as a mobile phone, personal data assistant, laptop computer, tablet personal computer, car navigation system, hand-held GPS unit, or "smart" device. More generally, the client device 115 represents any personal computing device or any other processing device having a user interface and CPU and capable of displaying a visual rendition of map data accessed from the map database 103 or other remote source of map data. In at least some of the embodiments, the client device 115 is equipped with a positioning module such as a GPS receiver, a Wireless Local Area Network (WLAN) receiver configured to perform triangulation, etc. Furthermore, while in some examples, the network 125 is described as a wireless network, the network 125 may be any wired or wireless network, where the client 115 is a device on the network.

The servers 105, 110 and the client 115 are also adapted to execute computer program modules for providing functionality described herein. As used herein, the terms "module" and "routine" refer to computer program logic used to provide the specified functionality. Thus, a module or a routine can be implemented in hardware, firmware, and/or software. In one embodiment, program modules and routines are stored on a storage device, loaded into memory, and executed by a processor or can be provided from computer program products that are stored in tangible computer-readable storage mediums (e.g. RAM, hard disk, optical/magnetic media, etc.).

The map database 103, which may be stored in or may be separate from the server 105, contains map data that can be used to generate a digital map or that can be used by, for example, by an application to create geofences from place data. Physical roads, waterways, parks, landmarks, and other geographic elements are example places that may be represented in the map data. The data representation for each place generally includes a set of coordinates (e.g., latitude and longitude) for each vertex and for the center. The data representation for a library, for example, can include a location and a number of attributes, such the physical geometry, the number of stories, height of each story, center coordinates, building type, etc.

The map data stored in the map database 103 can be obtained from several different sources such as the New York City Open Accessible Space Information System (OASIS) and the U.S. Census Bureau Topologically Integrated Geographic Encoding and Referencing system (TIGER). Further, the database 103 does not need to be physically located within server 105. For example, the database 103 can be stored in external storage attached to the server 105, or can be stored in a network attached storage. Additionally, there may be multiple servers 105 that connect to a single database 103. Likewise, the map database 103 may be stored in multiple different or separate physical data storage devices.

A map module 138 may be implemented on the client 115 or on the map application server 110. A map module 138 may interpret and use map data from the database 103 to display a digital map on a user interface 134. Additionally or alternatively, the map module 138 can provide alerts when a user enters or approaches a certain location, display advertisements, offers, coupons, etc. relevant to the business, provide driving, cycling, walking, or other directions, etc. In many of these applications, the map module 138 relies on a dynamic geofencing system of this disclosure to accurately and efficiently determine whether a certain location is within a geofence.

In this embodiment, the dynamic geofencing system is implemented as a dynamic geofencing module 140 operating in the map module 138. More generally, however, the dynamic geofencing system can be implemented in a user device, a network server, or both. In operation, the geofencing module 140 may break down a place geometry, which can be an arbitrary polygon or complex shape, into a composite geofence consisting of a set of basic shapes. Example techniques of the dynamic geofencing module 140 are referenced in greater detail in the remaining figures.

Referring now to FIG. 2A, a diagram 200 schematically illustrates single-circle geofences 201 and 202 defined for geographic places 203 and 204, respectively. The geofences 201 and 202 are created using a point and radius technique. More particularly, a geofence in this case is defined by a single point and a corresponding constant radius, so that each the geofence encloses a circular area. The center coordinate and a radius for each geofence corresponding may be stored in the map database 103 for each geographic place. Generally speaking, relatively little computing power is required to define and use circular geofences.

FIG. 2B is a diagram 250 in which a circular geofence 205 around a place 206 with complex geometry. The circular geofence 205 is defined similar to the circular geofences 201 and 202 described above in FIG. 2A.

Although circular geofences can be easily defined, such geofences generally are not very accurate and can yield undesirable results in some situations. For example, the geofence 201 extends past the perimeter of the place 203 and even partially covers place 204. Similarly, the geofence 202 extends beyond the perimeter of place 204 and partially covers place 203. FIG. 2B further demonstrates the inability of a circular geofence to accurately represent place geometry. The circular geofence 205 does not accurately represent the non-trivial geometry of place 206 and covers a significant area beyond the perimeter of place 206.

On the other hand, FIG. 3A depicts the same places 203 and 204 with composite geofences 301 and 302, respectively, created using a set of basic shapes. The set of basic shapes can include, for example, rectangles, circles, triangles, etc. In this case, each of the composite geofences 203 and 204 is a single square that coincides with the geometry of the corresponding place. In FIG. 3B, a composite geofence 305 created using a set of basic shapes. The composite geofence 305 includes two squares and a triangle.

In these examples, the places 203, 204, and 206 are more accurately represented by the composite geofences. Unlike the circular geofences 201 and 202, the composite geofences 301 and 302 do not overlap. Further, the composite geofences 301, 302, and 305 cover only small areas outside the places 203, 204, and 206, respectively.

Figure 4:
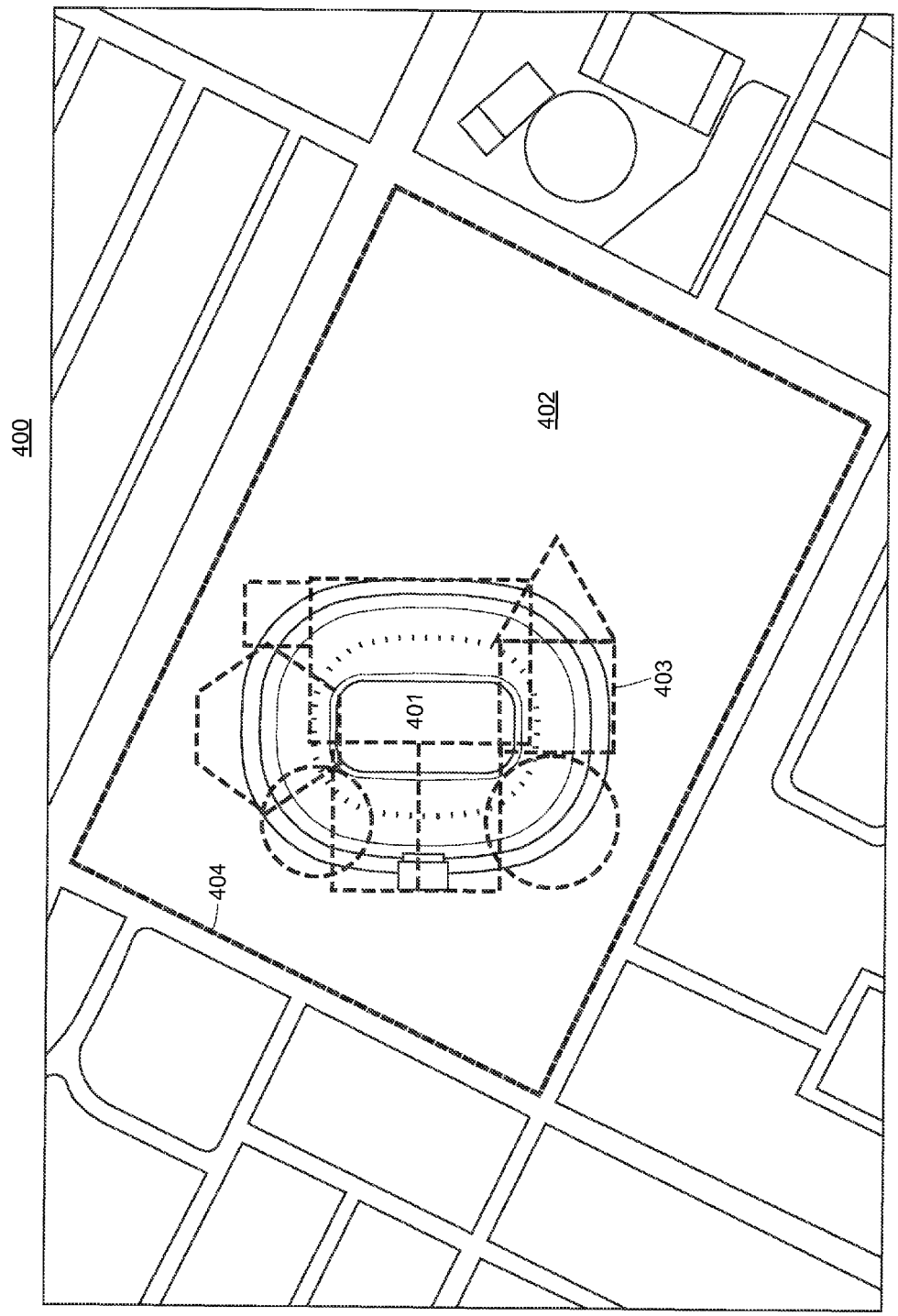
FIG. 4 is a schematic illustration displaying an interior composite geofence for a place with an exterior composite geofence generated in view of surrounding place geography.

FIG. 4 is a diagram 400 of a place 401 with an interior composite geofence 403 and an exterior composite geofence 404 generated in view of surrounding place geography. Interior and exterior geofencing may be used by a mapping application to not only check whether a user is located in a place, but also to check whether the user is located near a place, for example.

In the diagram 400, the place 401 represents a stadium surrounded by a parking lot 402. The interior composite geofence 403 may include several basic shapes. Since the place 401 has a non-trivial, relatively complex geometry, the dynamic geofencing module 140 may use any or all of the basic shapes at its disposal. A basic shapes databank is illustrated below the interface 400 to define the set of shapes available for creating a geofence. In an example implementation, the basic shapes databank includes a circle 405, a hexagon 406, a triangle 407 and a square 408. Other basic shapes (e.g. parallelogram) not shown in the figure may also be used. In operation, the dynamic geofencing module 140 can apply such operations to the shapes 405-408 as translation, scaling, rotation, etc.

When creating the exterior composite geofence 404, the dynamic geofencing module 140 may analyze significant features of the surrounding place geometry to determine which features should be included. For example, in the illustration 400, the parking lot 402 is a feature closely related to the stadium 401, and a user located within the parking lot 402 should be considered near the stadium 401. The exterior composite geofence 404 also can be created using a set a basic shapes.

Figure 5:
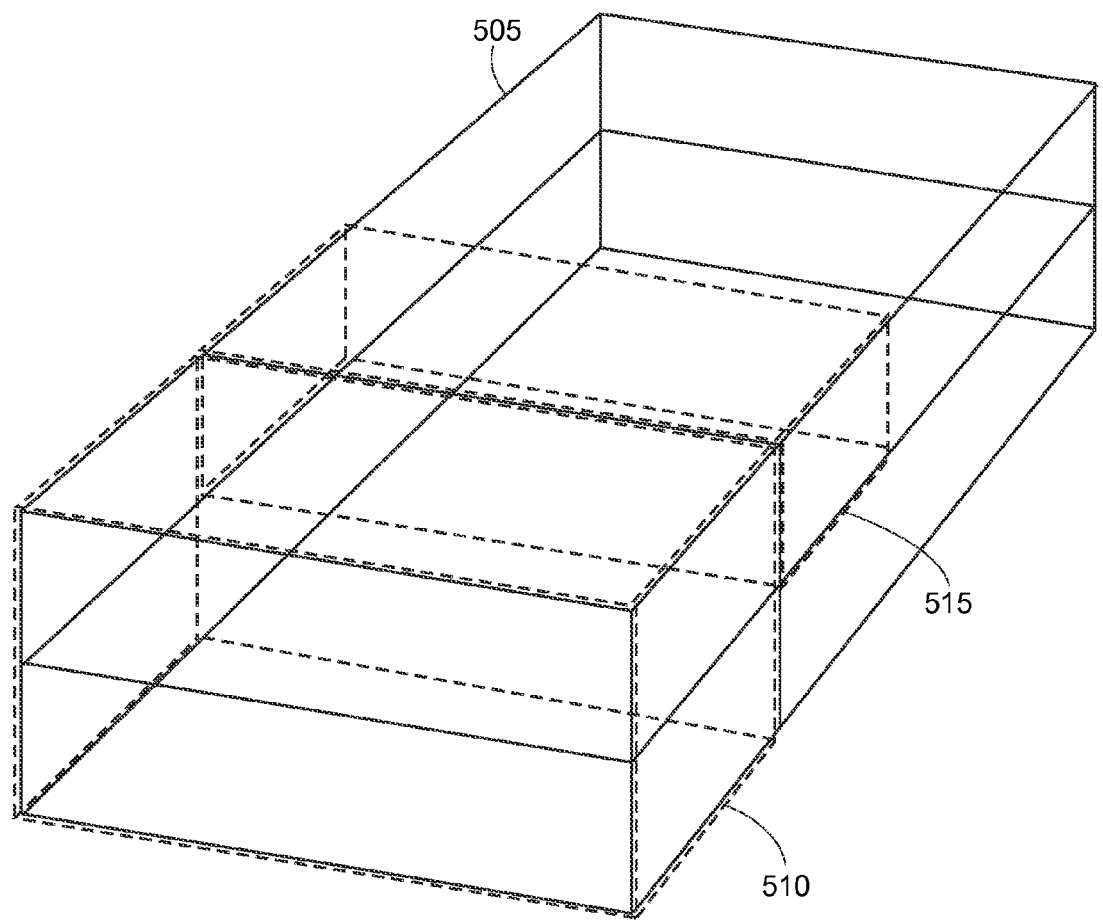
FIG. 5 is an example of a three-dimensional composite geofence made up of basic three-dimensional shapes or solids.

Composite geofences may also be created in three dimensions, as illustrated in FIG. 5. The place 505 may represent a section of any multi-story building. For example, place 505 may represent two stories of a shopping mall. A store in the mall may be located primarily on one floor but also extend onto another level of the building.

In an embodiment, multiple cuboids may be used to create a three-dimensional composite geofence for the store. In this example, cuboid 510 encompasses a multi-story section of the store while cuboid 515 covers a section of the store contained on a single floor. The combination of cuboids 510 and 515 create a three-dimensional geofence which represents the place geometry of the store. Other basic three-dimensional shapes (cube, sphere, pyramid, etc.) may be used to create a three dimensional composite geofence.

As indicated above, to generate a composite geofence, the dynamic geofencing module 140 according to one implementation first determines a "bounding rectangle" for the corresponding place. More particularly, when the outline of a geographic place is described by a polygon having N vertices defined using (x, y) coordinate tuples, the dynamic geofencing module 140 first determines a bounding triangle for the polygon using any suitable technique known in the art. The dynamic geofencing module 140 in this embodiment then identifies a set of circles that efficiently cover the rectangle. To this end, the dynamic geofencing module 140 can implement, for example, the technique described in "Covering a rectangle with six and seven Circles," by J. B. M. Melissen and P. C. Shuur, *Discrete applied Mathematics*, vol. 99, issues 1-4, 1 Feb. 2000. Further, the dynamic geofencing module 140 can cover the rectangle with any desired number of circles.

Once the dynamic geofencing module 140 has covered the bounding rectangle with L circles, the dynamic geofencing module 140 can eliminate those of the L circles that are complete outside the geometry of the geographic place, so that the remaining circles define the composite geofence.

In another embodiment, the dynamic geofencing module 140 tiles the geometry of a geographic place by arranging multiple instances of a certain shape, such as a hexagon, a rectangle, a triangle, a parallelogram, etc. The size of each instance can be selected so as to line up the multiple instances of the shape perfectly with each other without overlapping. To this end, the dynamic geofencing module 140 can implement one or several techniques described in, for example, *Tiling and Patterns* by Branko Gruenbaum and G. C. Shephard in *Tilings and Patterns* (W.H. Freeman and Co. 1987), "Tilings by Regular Polygons—II: A Catalog of Tilings" by D. Chavey in *Computers and Mathematics with*

Applications 17:147-165 (1989), and/or *An Introduction to Geometry of N Dimensions*, "Chapter X: The Regular Polytopes," by D. M. Y. Sommerville (E. P. Dutton 1958). The dynamic geofencing system then can represent each of these tiles by a circle, for example, by determining the center of each tile and determining a radius of a circle that entirely covers the tile.

Figure 6:
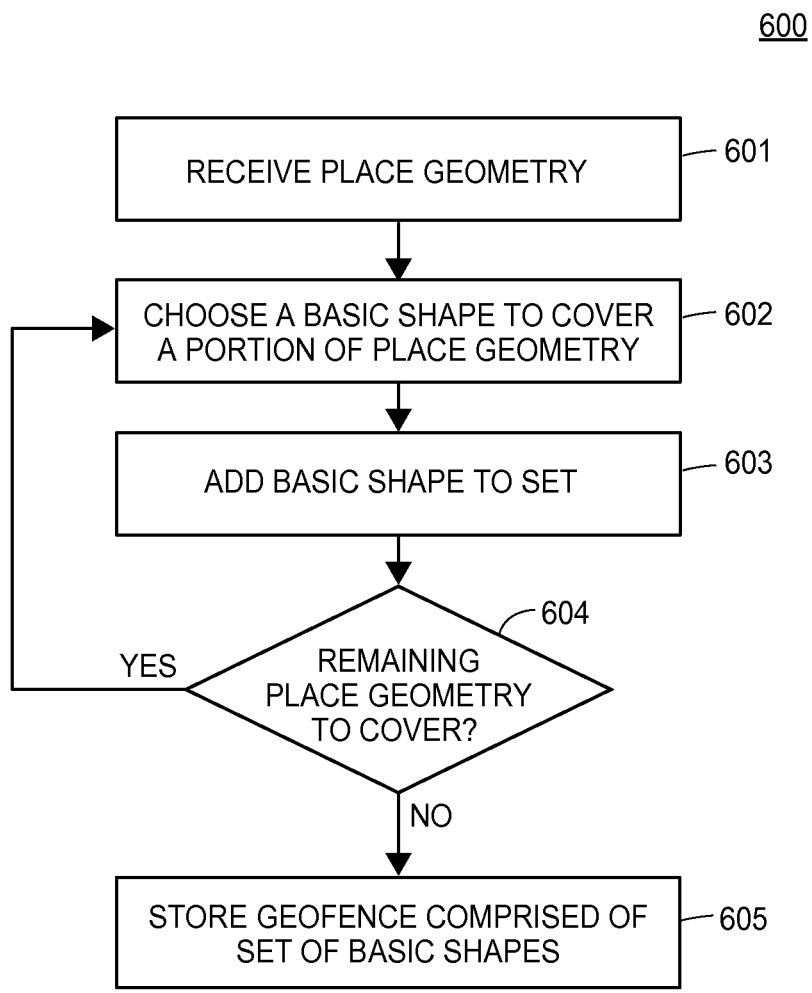
FIG. 6 is a flow diagram of an exemplary method for generating composite geofences using basic shapes, which can be implemented in the dynamic geofencing module of FIG. 1.

FIG. 6 is a flow diagram of another exemplary method 600 for generating composite geofences using basic shapes, which can be implemented in a system 100, for example. In an embodiment, the method 600 is implemented in the client device 115, and executed by the dynamic geofencing module 140. In another embodiment, however, the method 600 is implemented in the server 105 or another suitable network device. For convenience, the method 600 is discussed below with reference to the geofencing module 140.

The method begins at block 601, where the dynamic geofencing module 140 receives place geometry from servers 105 and 110 through the network 125. Generally speaking, place geometry is data that describes the physical boundary of a place. Place geometry can be stored in the map database 103, for example. Place geometry in general can be a polygon having any number of vertices and angles, or any other shape.

At block 602, the dynamic geofencing module 140 may begin to break down the place geometry into a set of basic shapes. The module 140 may start by choosing a basic shape to cover a portion of the place geometry. The module 140 may choose a shape based on one or several factors. Once a basic shape has been chosen, at block 603 the basic shape will be added to a set of shapes which comprise the composite geofence.

At block 604, the dynamic geofencing module 140 may check whether the place geometry has been sufficiently represented by the set of basic shapes which comprise the composite geofence. In an embodiment, a composite geofence may be considered sufficient once the place geometry is completely covered. In another embodiment, a composite geofence may be considered sufficient once a certain percentage (e.g. 99%) of the place geometry has been covered.

If the composite geofence is not sufficient, the module 140 may continue to add basic shapes to the composite geofence. In an embodiment, the basic shapes which comprise the composite geofence may overlap. In another embodiment, the composite geofence may only consist of shapes which border each other and not permit overlapping. Similarly, in certain embodiments the composite geofence may consist of basic shapes which extend past the perimeter of the place geometry, while in other embodiments the composite geofence must remain completely within the bounds of the place geometry.

At block 605 the dynamic geofencing module 140 may store a sufficiently complete composite geofence. The composite geofence may be stored on the client memory 132, or sent through the network 125 to be stored on the servers 110 and 105.

Figure 7:
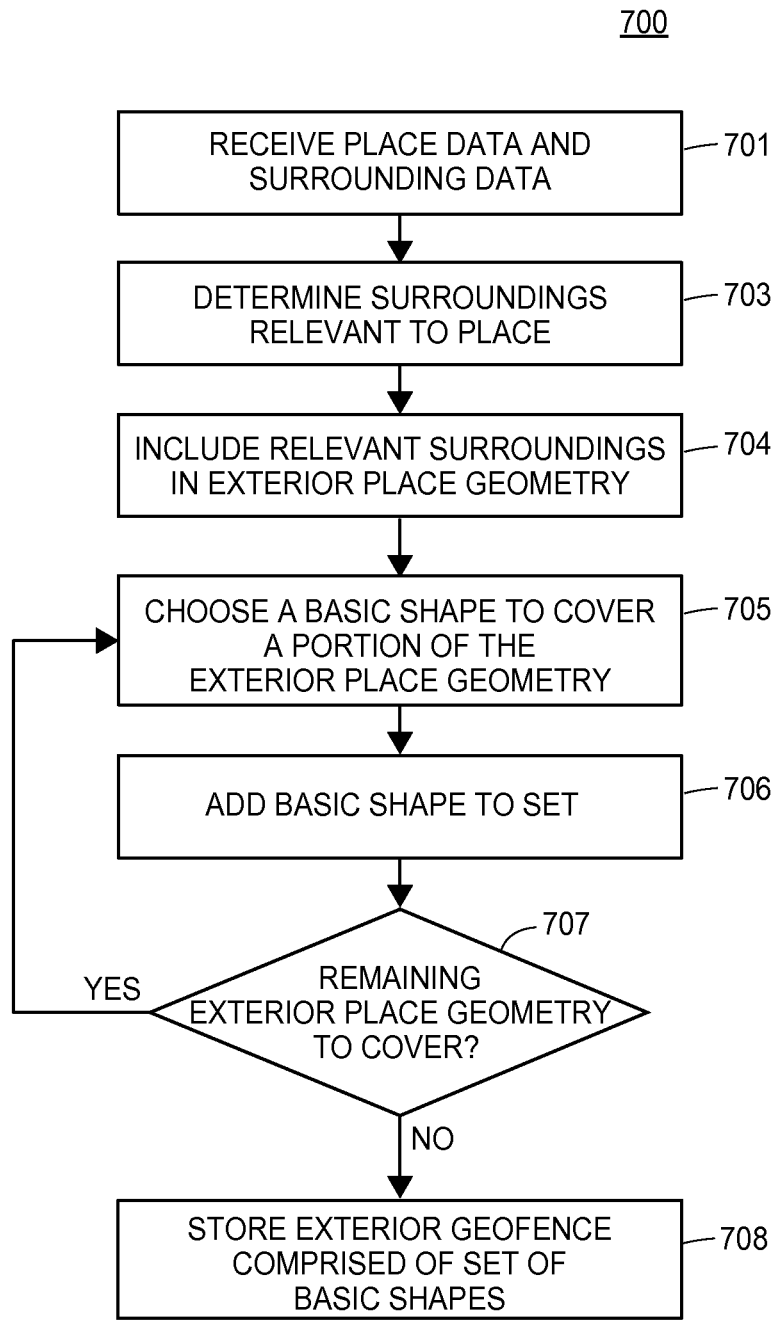
FIG. 7 is a flow diagram of an exemplary method for generating exterior composite geofences in view of surrounding place geography, which can be implemented in the dynamic geofencing module of FIG. 1.

With reference to FIG. 7, the system 100 described herein may be employed in a method 700 for creating exterior composite geofences. Exterior composite geofences are used to determine whether a user location is near a place. For example, an exterior composite geofence may include several features determined by the dynamic geofencing module 140 to be closely associated with a place such as a parking lot, driveway, alley, courtyard, etc. Alternatively, the dynamic geofencing module 140 may exclude certain nearby locations from an exterior geofence. For example, an expressway may be excluded from an exterior geofence of a store, since a majority of the traffic on the expressway is likely unrelated to the store.

Similar to method 600 described above, the method 700 can be implemented in the client device 115 and executed by the dynamic geofencing module 140, for example. At block 701, the dynamic geofencing module 140 may receive place data and information about the surroundings data from the map database 103 through the network 125. The dynamic geofencing module 140 may then interpret information from the place data such as the type of place (e.g. store, business, restaurant, etc.).

At block 703, the dynamic geofencing module 140 may analyze the surroundings data to determine whether the surroundings are relevant to the place, as discussed above. At block 704, the dynamic geofencing module 140 may begin to create an exterior place geometry to include all of the relevant surroundings. In an embodiment, the exterior place geometry does not include any portion of the place geometry. The exterior place geometry, similar to place geometry, can be any type of polygon or complex shape.

At block 705, the dynamic geofencing module 140 may begin to create a composite geofence for the exterior place geometry. The dynamic geofencing module 140 may start by choosing a basic shape to cover a portion of the exterior place geometry. Once a basic shape has been chosen, at block 706 the basic shape will be added to a set of shapes which comprise the exterior composite geofence.

At block 707, the dynamic geofencing module 140 may check whether the exterior place geometry has been sufficiently represented by the selected basic shapes. In an embodiment, an exterior composite geofence may be considered sufficient once the exterior place geometry is completely covered. In another embodiment, an exterior composite geofence may be considered sufficient once a certain percentage of the exterior place geometry has been covered.

If the exterior composite geofence is not sufficient, the module 140 may continue to add basic shapes to the exterior composite geofence. In an embodiment, the basic shapes which comprise the exterior composite geofence may overlap. In another embodiment, the exterior composite geofence may only consist of shapes which border each other without overlapping. Similarly, in certain embodiments the exterior composite geofence may consist of basic shapes which extend past the perimeter of the exterior place geometry, while in other embodiments the exterior composite geofence must remain completely within the bounds of the exterior place geometry.

At block 708 the dynamic geofencing module 140 may store a sufficiently complete exterior composite geofence. The exterior composite geofence may be stored on the client memory 132, or sent through the network 125 to be stored on the servers 110 and 105.

Once exterior and interior composite geofences are completed and stored for all places in a digital map, the dynamic geofencing module 140 may use the composite geofences to check if a user is located within or near a place.

Figure 8:
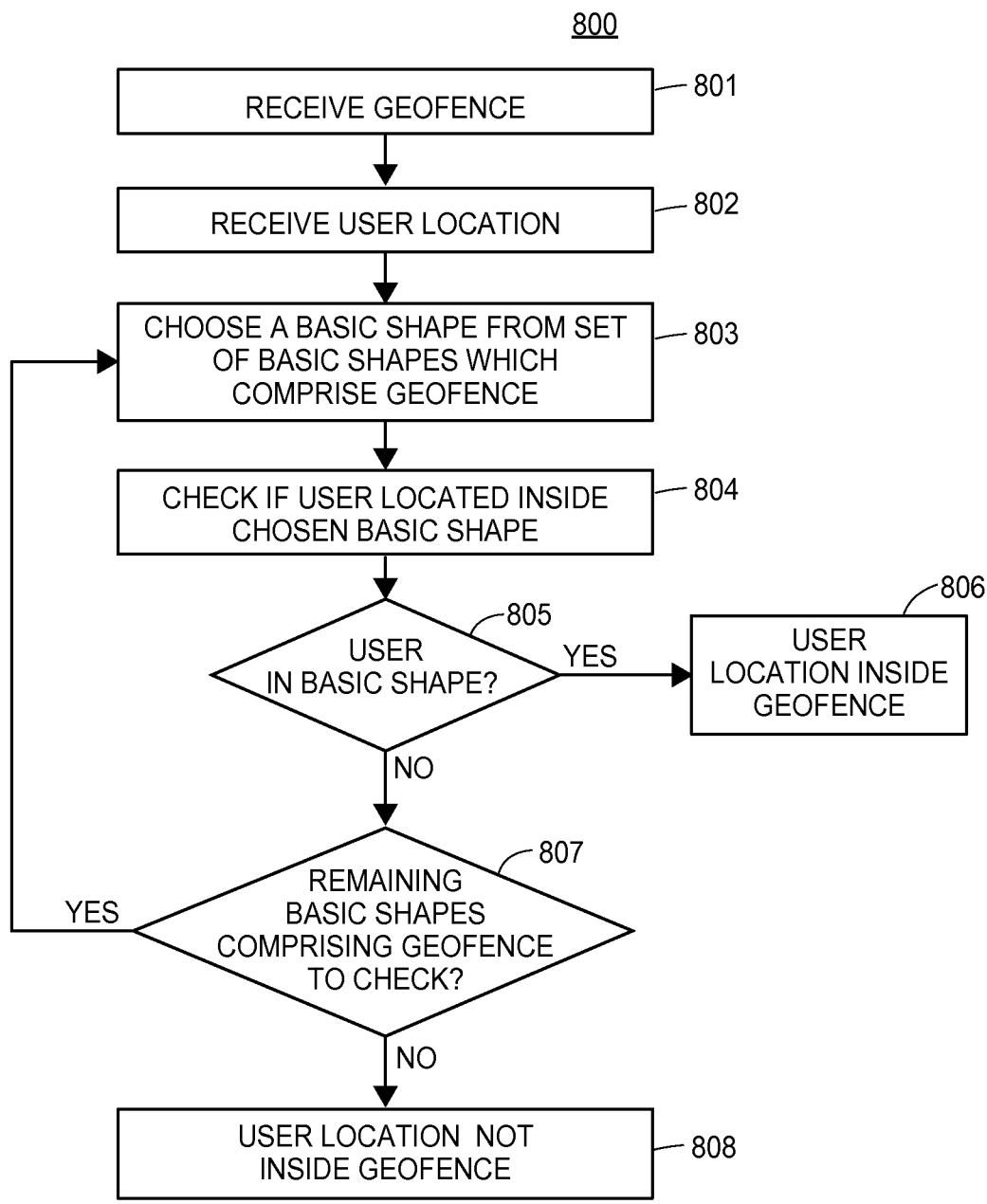
FIG. 8 is a flow diagram of an exemplary method for determining whether a GPS coordinate is located within a composite geofence, which can be implemented in the dynamic geofencing module of FIG. 1.

FIG. 8 is a flow diagram of an example method 800 for determining whether positioning coordinates correspond to a location within a composite geofence. At block 801 the geofencing module 140 receives a composite geofence. The composite geofence may be retrieved from memory 132 on the client device or from the servers 110 and 105.

At block 802, the geofencing module 140 receives a user location. In an embodiment, the user location is received as a set of GPS coordinates supplied by the map module 138.

At block 803, the geofencing module 140 will begin to check whether the GPS coordinates are located within the composite geofence. The geofencing module 140 may select one of the basic shapes that form the composite geofence.

At block 804, the geofencing module 140 checks whether the user's GPS coordinates lie within the chosen basic shape. The calculation may be performed relatively easily due to the simple geometry of the basic shape. In comparison, calculating whether a point is located within an arbitrary polygon or complex shape may require significantly greater computational resources. At block 805, the geofencing module 140 determines whether the flow should proceed to block 806 or block 807.

At block 806, the geofencing module 140 may generate an indication that the user is located within the composite geofence. The geofencing module 140 may then relay this information to the servers 105 and 110. Depending on the embodiment, the geofencing module may then present the user with information regarding the place.

At block 807, the geofencing module 140 may check whether all of the basic shapes from the composite geofence have been checked. If any basic shapes in the set remain unchecked, the geofencing module 140 may select another basic shape to test. The geofencing module 140 may continue to test basic shapes in the set until it is determined that a user's location falls within the boundary of one of the basic shapes, or until all basic shapes in the set have been checked and return negative results.

If the user's location is not enclosed by any of the basic shapes which comprise the composite geofence, then the user's location is not within the geofence. At block 808 the geofencing module may conclude that the user is not located within the geofence. The geofencing module 140 may then restart the method 800 using a different geofence. The process may continue until a user is found to be located with a geofence in the digital map, or until all geofences have been checked and return negative results.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

For example, the network 125 may include but is not limited to any combination of a LAN, a MAN, a WAN, a mobile, a wired or wireless network, a private network, or a virtual private network. Moreover, while only one client 115 is illustrated in FIG. 1 to simplify and clarify the description, it is understood that any number of client computers are supported and can be in communication with the servers 105 and 110.

Additionally, certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmissions (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Still further, the figures depict preferred embodiments of a map editor system for purposes of illustration only. One skilled in the art will readily recognize from the following discussion that alternative embodiments of the structures and methods illustrated herein may be employed without departing from the principles described herein Upon reading this disclosure, those of skill in the art will appreciate still additional alternative structural and functional designs for a system and a process for generating and using composite geofences through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed:

1. A mobile computing device comprising:
one or more processors;
a user interface;
a network interface to couple the mobile computing device to a map data server via a wireless communication network;
a non-transitory computer-readable medium storing thereon instructions for determining whether a certain geographic location, corresponding to a current location of the mobile computing device, is within a virtual perimeter of a geographic place, wherein the instructions, when executed on the one or more processors, cause the mobile computing device to:
receive, from the map data server, a single complex shape that describes a geometry of the geographic place,
determine a plurality of component shapes that approximately make up the geometry of the geographic place, wherein each of the plurality of component shapes is selected from a limited set of scaleable basic shapes, including:
    determine a bounding shape for the geometry,
    determine a plurality of non-overlapping basic shapes that fill the bounding shape, and
    eliminate, from the plurality of non-overlapping basic shapes, the basic shapes that are entirely outside the geometry; wherein the remaining non-overlapping shapes define the plurality of component shapes that approximately make up a geometry of the geographic place;
determine whether the certain geographic location is within at least one of the plurality of component shapes,
generate an indication that the geographic location is within the virtual perimeter if the geographic location is within at least one of the plurality of component shapes, and
provide the indication via the user interface.

2. The mobile computing device of claim 1, wherein the bounding shape for the geometry is a bounding rectangle, and wherein the plurality of non-overlapping basic shapes is a plurality of non-overlapping circles that fill the bounding rectangle.

3. The mobile computing device of claim 1, wherein to determine the plurality of component shapes, the instructions cause the mobile computing device to:
determine a plurality of contiguous cells, each of which is at least partially covered by the geometry, and
for each of the plurality of contiguous cells, determine a respective circle that completely covers the cell;
wherein the circles define the plurality of component shapes that approximately make up a geometry of the geographic place.

4. The mobile computing device of claim 1, wherein the limited set of scaleable basic shapes is a set of two-dimensional (2D) shapes including a circle and a rectangle.

5. The mobile computing device of claim 1, wherein the limited set of scaleable basic shapes is a set of three-dimensional (3D) shapes including a sphere and a rectangular cuboid.

6. The mobile computing device of claim 1, wherein the instructions further cause the mobile computing device to display a digital map on the user interface, wherein the digital map includes the single complex shape that describes the geometry of the geographic place.

7. The mobile computing device of claim 1, wherein the instructions further cause the mobile computing device to display at least one of an advertisement, an offer, or a coupon if the geographic location is within at least one of the plurality of component shapes.

8. A method for generating virtual perimeters of geographic places on mobile computing devices, the method comprising:
receiving, at a mobile computing device from a map data server via a wireless communication network a single complex shape that describes a geometry of a geographic place;
obtaining, at the mobile computing device, a limited set of one or more scaleable basic shapes;
generating, at the mobile computing device, an approximate representation of the geometry as a plurality of component shapes, each selected from the limited set of scaleable basic shapes, including:
    determining a bounding shape for the geometry,
    determining a plurality of non-overlapping basic shapes that fill the bounding shape, and
    eliminating, from the plurality of non-overlapping basic shapes, the basic shapes that are entirely outside the geometry; wherein the remaining non-overlapping shapes define the plurality of component shapes that approximately make up a geometry of the geographic place;
using, at the mobile computing device, the approximate representation of the geometry as a virtual perimeter of the geographic place; including:
determining whether a geographic point, corresponding to a current location of the mobile computing device, is within the virtual perimeter, and
generating an indication of whether the geographic point is within the virtual perimeter.

9. The method of claim 8 wherein the bounding shape for the geometry is a bounding rectangle, and wherein the plurality of non-overlapping basic shapes is plurality of non-overlapping instances of the circle that fill the bounding rectangle.

10. The method of claim 8, wherein generating the approximate representation of the geometry includes
determining a plurality of contiguous cells, each of which is at least partially covered by the geometry,
determining a respective circle that completely covers the cell;
wherein the circles define the plurality of component shapes that approximately make up a geometry of the geographic place.

11. The method of claim 8, wherein the limited set of scaleable basic shapes includes one or more of (i) a hexagon, (ii) a triangle, (iii) a rectangle, (iv) a parallelogram, or (v) a circle.

12. The method of claim 8, wherein:
the single complex shape that describes the geometry describes a 3D outline, and
the limited set of shapes includes one or more 3D solids.

13. The method of claim 8, wherein the virtual perimeter of the geographic place is an interior virtual perimeter of the geographic place; the method further comprising:
receiving, by the one or more computing devices, a description of geometries of a plurality of features adjacent to the geographic place;
generating, by the one or more computing devices, an approximate representation of the geometry of the geographic place along with the geometries of the plurality of features as a second plurality of component shapes, each selected from the limited set of shapes, wherein the second plurality of component shapes corresponds to an exterior virtual perimeter of the geographic place.

14. A portable computing device comprising:
a positioning module configured to determine a current location of the computing device; and
processing hardware coupled to the positioning module and configured to:
receive, via a network interface which couples the mobile computing device to a map data server via a wireless communication network, a description of a virtual perimeter of a geographic place, including a plurality of component shapes that approximately make up the geometry of the geographic place, wherein the component shapes are selected from a limited set of one or more scalabeable basic shapes by (i) determining a bounding shape for the geometry, (ii) determine a plurality of non-overlapping basic shapes that fill the bounding shape, and (iii) eliminating, from the plurality of non-overlapping basic shapes, the basic shapes that are entirely outside the geometry, wherein the remaining non-overlapping shapes define the plurality of component shapes that approximately make up a geometry of the geographic place;

determine whether a geometric point corresponding to the current location of the portable computing device is within one or more of the plurality of component shapes, and in response to determining that the geometric point is within at least one of the plurality of component shapes, generate an indication that the portable computing device is within the virtual perimeter of the geographic place.

15. The portable computing device of claim 14, wherein the virtual perimeter is an interior perimeter, the processing hardware further configured to:

receive, via a network interface which couples the mobile computing device to a map data server via a wireless communication network, a description of an exterior perimeter of the geographic place, including a second plurality of component shapes that approximately make up the geometry of the geographic place along with geometries of a plurality of features adjacent to the geographic place, determine whether the geometric point corresponding to the current location of the portable computing device is within one or more of the second plurality of component shapes, and in response to determining that the geometric point is within at least one of the second plurality of component shapes, generate an indication that the portable computing device is within the exterior perimeter of the geographic place.

16. The portable device of claim 14, wherein the plurality of component shapes includes a plurality of instances of a circle.

17. The portable device of claim 14, wherein the limited set of scaleable basic shapes includes (i) a hexagon, (ii) a triangle, (iii) a rectangle, (iv) a parallelogram, and (v) a circle.

18. The portable device of claim 14, wherein the virtual perimeter is a 3D outline, and wherein each of the plurality of component shapes is a 3D solid.

* * * * *